US011223321B2

(12) United States Patent
Bassi

(10) Patent No.: US 11,223,321 B2
(45) Date of Patent: *Jan. 11, 2022

(54) HYDRAULICALLY ACTUATED SOLAR ENERGY TRACKING AND HARVESTING SYSTEM

(71) Applicant: King Abdulaziz University, Jeddah (SA)

(72) Inventor: Hussain Bassi, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/393,473

(22) Filed: Aug. 4, 2021

(65) Prior Publication Data

US 2021/0367551 A1 Nov. 25, 2021

Related U.S. Application Data

(60) Continuation of application No. 17/019,510, filed on Sep. 14, 2020, now Pat. No. 11,121,672, which is a division of application No. 16/781,019, filed on Feb. 4, 2020, now Pat. No. 10,804,838, which is a division of application No. 16/030,902, filed on Jul. 10, 2018, now Pat. No. 10,581,370.

(51) Int. Cl.
*H02S 40/10* (2014.01)
*H02S 40/42* (2014.01)
*H02S 40/22* (2014.01)
*H02S 20/32* (2014.01)

(52) U.S. Cl.
CPC ............. *H02S 20/32* (2014.12); *H02S 40/10* (2014.12); *H02S 40/22* (2014.12); *H02S 40/425* (2014.12)

(58) Field of Classification Search
None
See application file for complete search history.

(56) References Cited

U.S. PATENT DOCUMENTS

| 6,123,067 A | 9/2000 | Warrick |
| 8,669,462 B2 | 3/2014 | Almogy et al. |
| 9,091,462 B2 | 7/2015 | Ratti et al. |
| 2005/0279400 A1 | 12/2005 | Banister |
| 2013/0047978 A1 | 2/2013 | Slocum |

(Continued)

FOREIGN PATENT DOCUMENTS

| CN | 102789046 B | 8/2014 |
| IN | 20020055913 | 3/2004 |
| WO | 2015/161921 A1 | 10/2015 |

*Primary Examiner* — Eli S Mekhlin
(74) *Attorney, Agent, or Firm* — Oblon, McClelland, Maier & Neustadt, L.L.P.

(57) ABSTRACT

A photovoltaic system includes a photovoltaic cell including a sun tracker, a top surface configured to generate electrical energy from the incident sunlight, and a bottom surface configured to thermally dispel heat generated by the photovoltaic cell; at least one mirror including a reflective surface; a plurality of actuators securing the at least one mirror the photovoltaic cell; at least one actuator pump connected to the plurality of actuators and configured to extend or retract the plurality of actuators and adjust the distance of the at least one mirror from the top surface; a heat exchanger thermally coupled to the bottom surface of the photovoltaic cell; and a fluid pump connected to the heat exchanger and configured to circulate the fluid through the heat exchanger.

3 Claims, 6 Drawing Sheets

(56) References Cited

U.S. PATENT DOCUMENTS

| | | |
|---|---|---|
| 2014/0166075 A1 | 6/2014 | Koppikar |
| 2015/0040964 A1 | 2/2015 | Matalon |
| 2017/0033733 A1 | 2/2017 | Chandan |

HYDRAULICALLY ACTUATED SOLAR ENERGY TRACKING AND HARVESTING SYSTEM

CROSS-REFERENCE TO RELATED APPLICATIONS

The present application is a continuation of U.S. application Ser. No. 17/019,510, now U.S. Pat. No. 11,121,672, having a filing date of Sep. 14, 2020 which is a division of U.S. application Ser. No. 16/781,019, now U.S. Pat. No. 10,804,838, having a filing date of Feb. 4, 2020, which is a division of U.S. application Ser. No. 16/030,902, now U.S. Pat. No. 10,581,370, having a filing date of Jul. 10, 2018.

BACKGROUND

Field of the Invention

The present disclosure is related to a method and apparatus for harvesting sunlight using a photovoltaic system with adjustable mirrors and an integrated cooling system.

Description of the Related Art

Although solar power plants have been in existence for many years, the electricity generated by them has been costly in comparison to alternative generation methods such as coal or natural gas. This problem has been compounded by the shortage of solar-grade silicon that has become expensive. A solution to compensate for the high production cost is to improve the PV efficiency by reducing the amount of material used and maintaining the sun's rays on to the surface of the photovoltaic panels during the daytime.

Current methods include concentrating the sunlight onto a smaller solar cell area and rotating the panel to track the sun. Regarding the former solution, reducing the material used in constructing the solar cell saves on cost, but concentrators can utilize complex optical systems that require expensive lenses and curved mirrors. Furthermore, rotating the entire panel assembly can lead to increased operation costs due to the need to move a heavy structure (both the full-sized solar cell assembly and the smaller solar cell with a large concentrator assembly). Thus, a solution that can track the sun's movement to direct sunlight onto the panel while being lightweight can improve efficiency while maintaining low operational costs. Furthermore, performance degradation from deposited surface debris can be mitigated via a solution that protects and cleans the solar cell surface.

As described in US Patent US20080314438A1, incorporated herein by reference in its entirety, an energy device includes a solar concentrator that concentrates at least 20 suns on a predetermined spot, a solar cell positioned on the predetermined spot to receive concentrated solar energy from the solar concentrator, and a water heater pipe thermally coupled to the solar cell to remove heat from the solar cell.

As described in U.S. Pat. No. 5,959,787A, incorporated herein by reference in its entirety, a solar panel is covered with a concentrating coverglass which allows efficient power generation for providing higher specific powers by space power arrays. A preferred frustoconical lens achieves a concentration ratio of about 4.5 at a thickness of about 1.0 mm. Efficient space power arrays with relatively wide tracking angle tolerance of up to about ±5° using these coverglasses permit heavier payloads in the satellite's operating systems over traditional satellite designs.

As described in US Patent US20090283144A1, incorporated herein by reference in its entirety, a solar panel assembly includes a solar concentrating mirror for enhancing the use of solar collection devices. The concentrating mirror includes a multilayer optical film and a compliant UV protective layer. The concentrating mirror reflects specific bandwidths of electromagnetic energy to the solar cell while eliminating or reducing undesirable bandwidths of electromagnetic energy that may degrade or adversely affect the solar cell.

As described in U.S. Pat. No. 5,374,317A, incorporated herein by reference in its entirety, a solar electric power system includes multiple reflectors to concentrate sun light onto a panel of photovoltaic (PV) cells. The power system, consisting of multiple reflectors, mounted PV cells, and a heat dissipation component, is mounted on a tracker that keeps the system directed to the sun.

As described in US Patent US20100282315A1, incorporated herein by reference in its entirety, a solar collector includes an elongated cross-sectionally V-shaped beam where the sidewalls are reflective and collect incident sunlight via deflecting the rays down the beam side walls toward the beam web.

In many solar energy harvesting designs, energy loss from performance inefficiency and operational costs can originate from multiple sources, including moving a heavy structure to track the sun's path, increased operating temperature of the photovoltaic, and deposition of debris on the photovoltaic surface. A solution can be designed with a lightweight alternative means of redirecting and maintaining sunlight on the photovoltaic (PV), a temperature regulation system for the PV, and a method of cleaning and protecting the PV surface.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to one or more embodiments of the disclosed subject matter, a photovoltaic system includes a photovoltaic cell including a sun tracker including circuitry configured to determine an angle and an intensity of incident sunlight, a top surface configured to generate electrical energy from the incident sunlight, and a bottom surface configured to thermally dispel heat; at least one mirror including a reflective surface and being disposed adjacent to the top surface of the photovoltaic cell; a plurality of actuators each having a first end and a second end, wherein the first end is attached to the photovoltaic cell and the second end is attached to the at least one mirror; at least one actuator pump connected to the plurality of actuators and configured to extend or retract the plurality of actuators and adjust the distance of the at least one mirror from the top surface; a heat exchanger disposed adjacent to and thermally coupled to the bottom surface of the photovoltaic cell, wherein the heat exchanger is filled with a fluid; and a fluid pump connected to the heat exchanger and configured to circulate the fluid through the heat exchanger.

According to another embodiment, the system can further include a motor attached to the second end of the plurality of hydraulic actuators, wherein the at least one mirror is secured to the motor and the motor is configured to rotate the at least one mirror, and a radiator connected to the heat exchanger and the fluid pump, wherein the fluid pump is configured to circulate fluid through the heat exchanger and the radiator, and the radiator is configured to cool the circulated fluid via thermal exchange with an external medium.

In another embodiment, a method of harvesting sunlight in a photovoltaic system includes determining, via circuitry of a sun tracker of a photovoltaic cell, an angle and an intensity of incident sunlight, wherein the photovoltaic cell includes a top surface configured to generate electrical energy from the incident sunlight and a bottom surface configured to thermally dispel heat; adjusting a height of at least one mirror based on the angle and the intensity of the incident sunlight such that the incident light is reflected by a reflective surface of the at least one mirror onto the top surface of the photovoltaic cell, wherein the at least one mirror is disposed adjacent to the top surface of the photovoltaic cell; adjusting a rotation angle of the at least one mirror based on the angle and the intensity of the incident sunlight such that the incident light is reflected by the reflective surface of the at least one mirror onto the top surface of the photovoltaic cell; generating, via the top surface of the photovoltaic cell, electrical energy from the incident sunlight that is reflected onto the top surface of the photovoltaic cell by the reflective surface of the at least one mirror; and dispelling, via the bottom surface of the photovoltaic cell, heat generated by the photovoltaic cell.

In another embodiment, the method further includes detecting, using the photovoltaic cell, that the intensity of the incident sunlight is below a predetermined threshold; adjusting, using the plurality of actuators, the height of the at least one mirror; and rotating, using the motor, the at least one mirror to induce turbulent air flow to clean the top surface of the photovoltaic cell of any deposited foreign matter.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
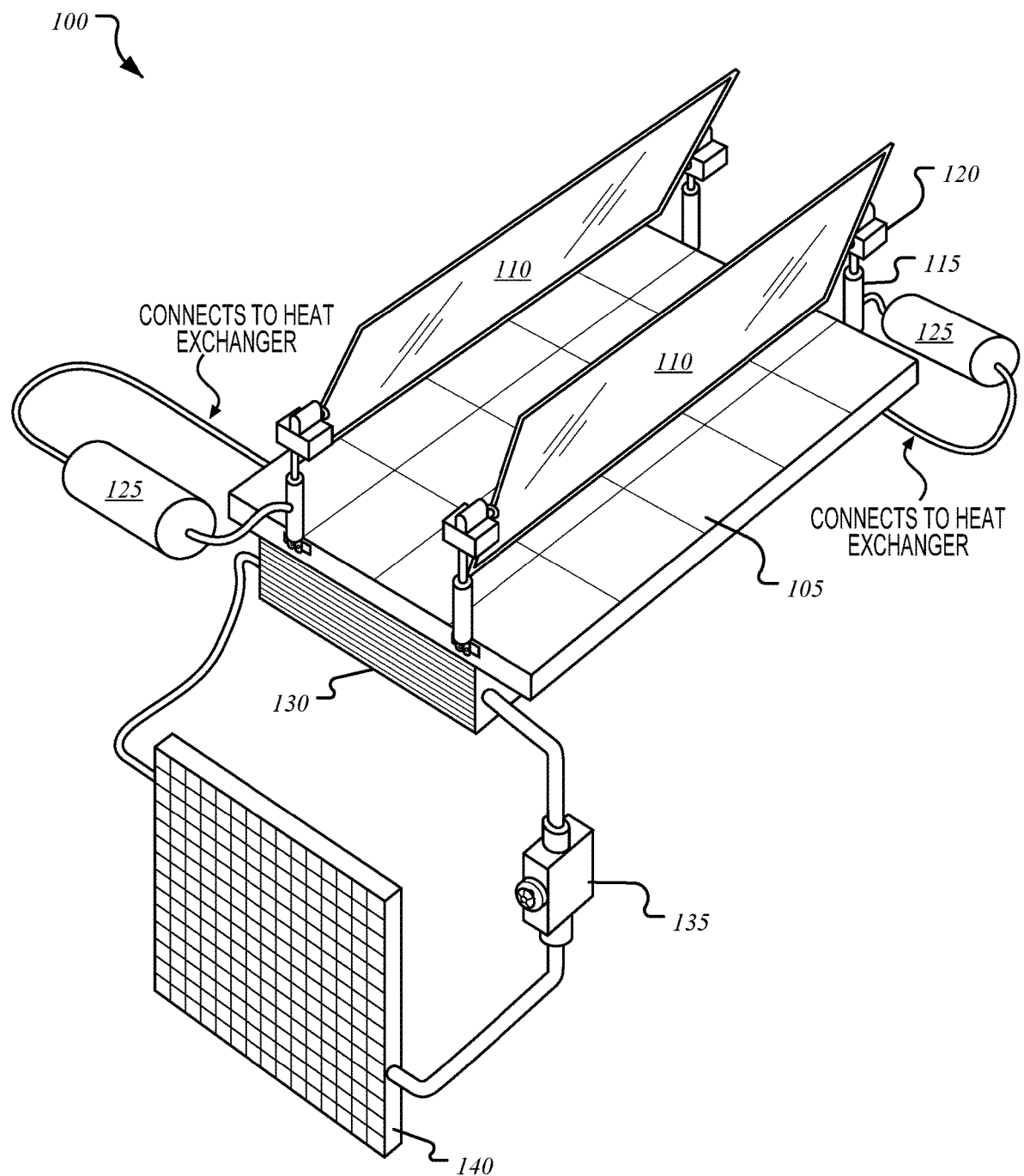
FIG. 1 is a schematic of the photovoltaic system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 illustrates an exemplary photovoltaic (PV) system 100 for harvesting sunlight according to one or more aspects of the disclosed subject matter. The PV system 100 includes a PV cell 105 to which at least one mirror 110 is attached to the PV cell 105. The at least one mirror 110 can represent one or more mirrors in the PV system 100. As shown in FIG. 1, the PV system 100 can include two mirrors, which will be the configuration referred to herein for convenience. Each of the mirrors 110 can be attached to the PV cell 105 using a hydraulic actuator 115 fitted with a DC motor 120, wherein the hydraulic action of the hydraulic actuator 115 can be controlled by an actuator pump 125 and the DC motor 120 can be configured to rotate the mirrors 110. A heat exchanger 130 can be attached to the PV cell 105 and fluid can be circulated through the heat exchanger 130 via a fluid pump 135 and into a radiator 140 to cool the fluid.

The PV cell 105 can include a sun tracking device with circuitry configured to determine an angle and an intensity of incident sunlight and adjust the mirrors 110 to reflect solar radiation onto the PV cell 105. The PV cell 105 can include a top surface configured to operate using the photovoltaic effect wherein incident or reflected solar radiation can be absorbed by the PV cell 105 and converted to an electric current. The generated electric current can be routed to myriad destinations depending on the intended use, for example, to a separate battery for storage, fed directly back into a power grid, or used immediately by an electrically attached device requiring electrical current for operation. The PV cell 105 can include a bottom surface configured to dispel heat generated by the incident sunlight and PV cell 105 operation. In an alternative aspect, the PV cell 105 can be a solar thermal cell, wherein absorbed solar radiation is converted to thermal energy and, for example, used to heat a liquid such as water to produce steam and power a turbine to generate electricity. The PV cell 105 can adopt a shape to most optimally cover a predetermined area. For example, the shape can be circular, square, or rectangular (as shown).

The mirrors 110 can be a panel of reflective material configured to reflect solar radiation onto the PV cell 105. The reflective material can reflect wavelengths in the range of the electromagnetic spectrum for solar radiation, which can include ultraviolet, visible light, and infrared radiation. For example, the mirror can exhibit specular reflectance of wavelengths from 100 nm to 3,000 nm, preferably 150 nm to 2,500 nm, or 250 nm to 2,000 nm. The mirrors 110 can be a flat or nearly flat rigid structure coated with a reflective material. The shape of the mirror can include circular, square, or rectangular (as shown). Non-limiting examples of materials for the rigid structure of the mirrors 110 can include at least one of glass fiber-reinforced polymer, aramid fiber-reinforced polymer, basalt fiber-reinforced polymer, carbon fiber-reinforced polymer, metal, metal alloy, and polymer. Non-limiting examples of materials for the coated reflective material can include at least one of tin(II) chloride, silver, aluminum, copper, and reflective paint, such as those impregnated with reflective structures such as glass or silver beads. The mirrors 110 are disposed above the top surface of the PV cell 105 and sized such that the mirrors 110 can cover all or nearly all the surface of the PV cell 105 when the mirrors 110 are rotated and laid flat. As shown in FIG. 1, the two mirrors 110 each cover approximately one half of the PV cell 105, and the mirrors 110 are disposed length-wise adjacent to and along the long edges of the PV cell 105.

In an alternative embodiment, the mirrors 110 can be disposed length-wise adjacent to and along the short edges of the PV cell 105, wherein the mirrors 110 can adopt less elongated, more square shapes and each cover approximately one half of the PV cell 105.

Figure 3A:
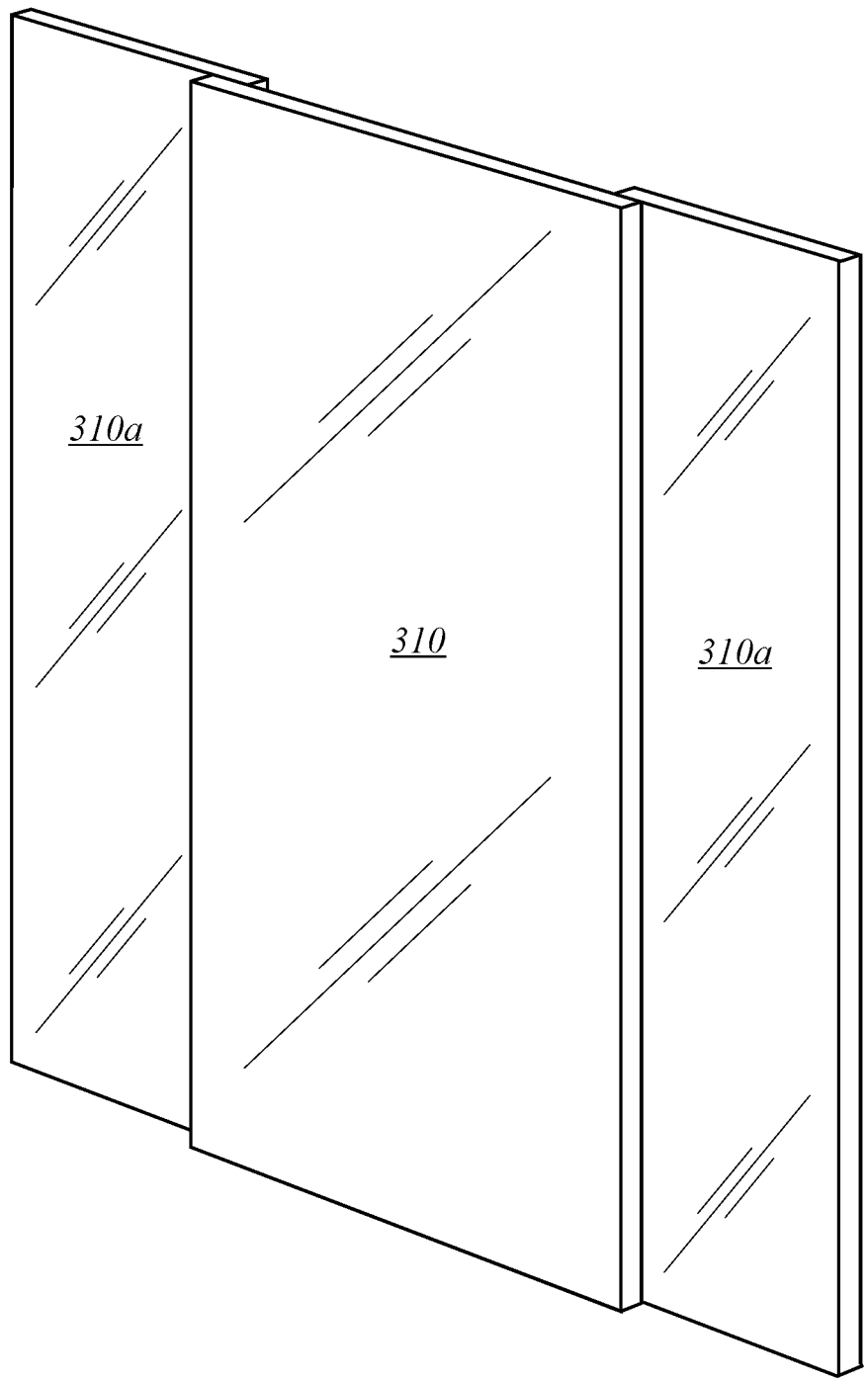
FIG. 3A is an isometric-view schematic of the photovoltaic system mirror with expandable side mirrors according to one or more aspects of the disclosed subject matter.
Figure 3B:
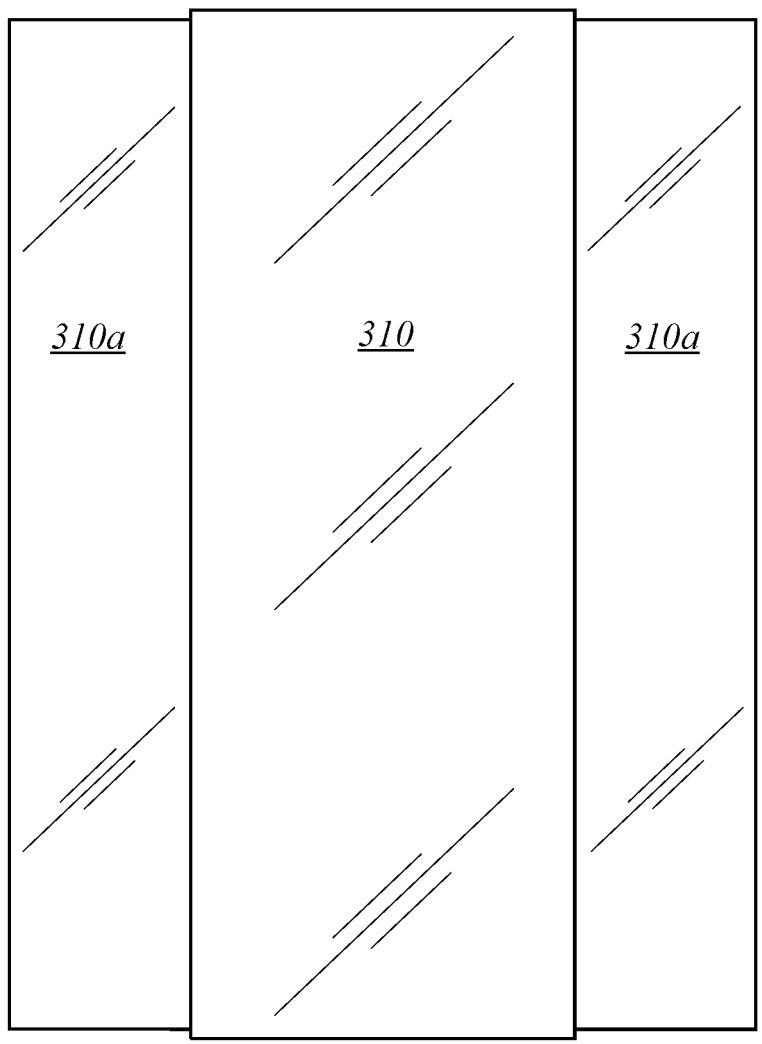
FIG. 3B is a front-view schematic of the photovoltaic system mirror with expandable side mirrors according to one or more aspects of the disclosed subject matter.
Figure 3C:
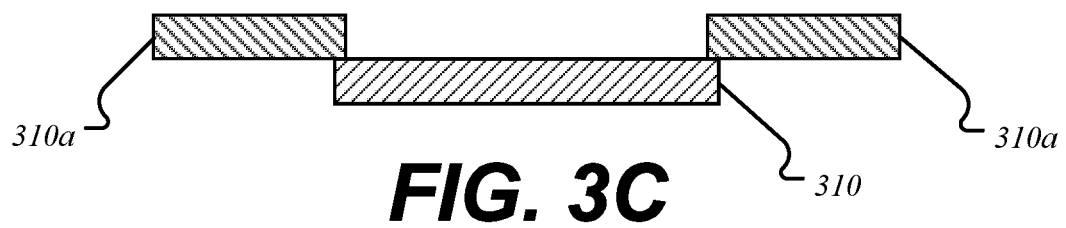
FIG. 3C is a top-view schematic of the photovoltaic system mirror with expandable side mirrors according to one or more aspects of the disclosed subject matter.

In another embodiment, the mirrors 110 can be configured to increase the reflective area via additional reflective panels. FIG. 3A-3C illustrates an at least one expandable mirror 310 according to one or more aspects of the disclosed subject matter. The at least one expandable mirror 310 can include a first side, the first side being reflective, and a second side opposite the reflective side. The at least one expandable mirror 310 can include at least one side mirrors 310a, for example two side mirrors 310a (as shown), that include a reflective side and a non-reflective side, and are configured to reposition outwards to a position flanking the at least one expandable mirror 310. For example, the side mirrors 310a can be disposed in a first position behind the at least one expandable mirror 310 wherein the reflective side of the side mirrors 310a is adjacent to the second side of the at least one expandable mirror 310. The side mirrors 310a can slide laterally outwards from the first position behind the at least one expandable mirror 310 to a second position flanking an edge of the at least one expandable mirror 310 wherein the reflective surface of the side mirrors 310a adds to the total reflective area of the at least one expandable mirror 310. Alternatively, the side mirrors 310a can be disposed in a first position behind the at least one expandable mirror 310 wherein the non-reflective side of the side mirrors 310a is adjacent to the second side of the at least one expandable mirror 310. The side mirrors 310a can fold outwards to a second position flanking an edge of the at least one expandable mirror 310 wherein the reflective surface of the side mirrors 310a adds to the total reflective area of the at least one expandable mirror 310. The additional reflective area can increase the amount of solar energy generated from the additional amount of sunlight reflected onto the PV cell 105.

The mirrors 110 are attached to the PV cell 105 via the hydraulic actuator 115 and the DC motor 120. The hydraulic actuator 115 is attached to the PV cell 105 at a predetermined location, for example on the side of the PV cell 105 panel, on a first end. On a second end of the hydraulic actuator 115, the DC motor 120 is attached. The mirrors 110 are attached to the DC motor 120 at a central point along an edge of the mirrors 110 such that the DC motor 120 can rotate the mirrors 110 in a clock-wise or counter-clock-wise rotation, or a mix of both directions wherein the rotation switches after a predetermined length of time. The rotation speed can be programmed to rotate at varying rotations per minute (RPM), for example less than 1 RPM, 100 RPM, or 5,000 RPM. The hydraulic actuator 115 can be configured to extend or retract based on an amount of fluid received from or pumped out via the actuator pump 125. This extension or retraction can increase or decrease the distance of the mirrors 110 from the top surface of the PV cell 105. The mirrors 110 can be connected to the PV cell 105 on both ends via the hydraulic actuator 115 and DC motor 120.

In an alternative embodiment, the mirrors 110 can be connected to the PV cell 105 on one end via the hydraulic actuator 115 and DC motor 120 and on an opposite end connected via a hydraulic actuator 115 without the DC motor 120.

Figure 2A:
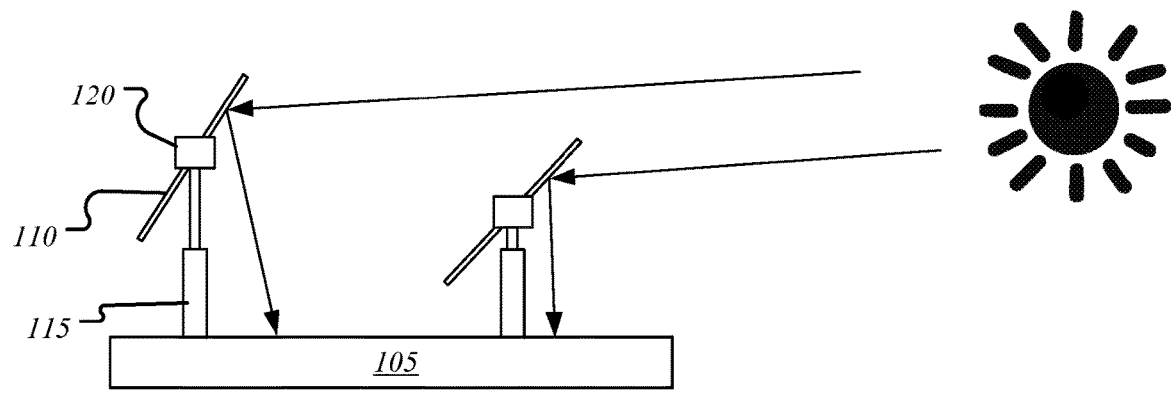
FIG. 2A is a side-view schematic of the photovoltaic system mirrors mounted on motors and rotated to redirect sunlight according to one or more aspects of the disclosed subject matter.
Figure 2B:
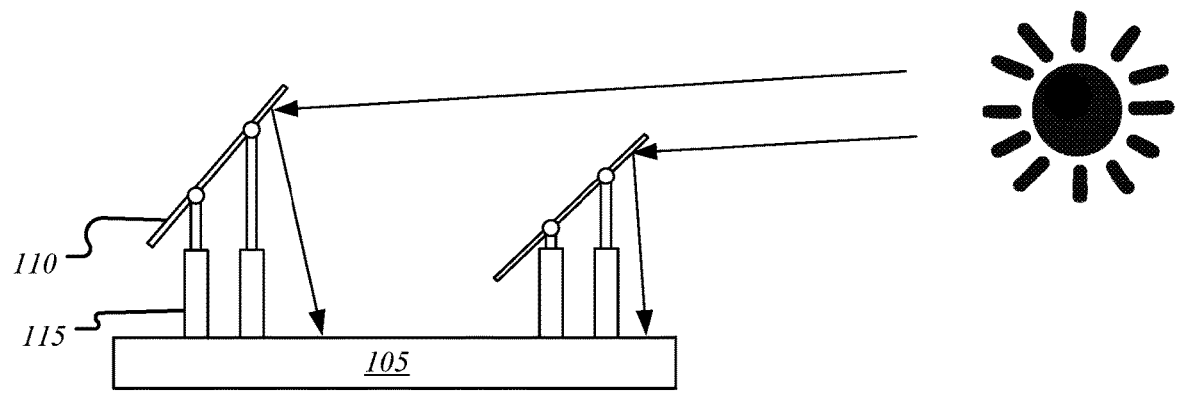
FIG. 2B is a side-view schematic of the photovoltaic system mirrors mounted on multiple actuators and angled to redirect sunlight according to one or more aspects of the disclosed subject matter.

FIG. 2B illustrates another attachment configuration according to one or more aspects of the disclosed subject matter. In another embodiment, each of the mirrors 110 can be connected to the PV cell 105 via two hydraulic actuators 115 without the DC motor 120. By varying the extension of each hydraulic actuator 115, the mirrors 120 can be adjusted to a predetermined optimal position to reflect the incident sunlight onto the PV cell 105 based on the location of the sun.

The heat exchanger 130 is disposed below the PV cell 105 and thermally coupled to the bottom surface of the PV cell 105. In order to maintain optimal operational temperatures of the PV cell 105, the heat exchanger 130 can be filled with a fluid and configured to transfer heat between the PV cell 105 and the fluid. The fluid can be separated from the PV cell 105 by a wall or in direct contact with the PV cell 105 for enhanced thermal coupling. The heat exchanger 130 can include an inlet, a serpentine channel network for the fluid to flow through, and an outlet for the fluid to exit. The fluid can be circulated from the heat exchanger 130 and into the radiator 140 via the fluid pump 135, wherein the heat exchanger 130, fluid pump 135, and radiator 140 are connect by tubing. The radiator 140 can be configured to cool the hot fluid pumped in from the heat exchanger 130 via a series of channels where the hot fluid flows through and is cooled by the air. In alternative embodiments, the heat exchanger 130 can be a shell and tube heat exchanger, a plate heat exchanger, a plate and shell heat exchanger, or a plate fin heat exchanger.

The actuator pump 125 is also connected to the heat exchanger 130. Fluid from the heat exchanger 130 can be pumped into the hydraulic actuator 115 via the actuator pump 125 in order to extend the hydraulic actuator 115 and raise the height of the mirrors 110. Fluid from the heat exchanger 130 can also be withdrawn from the hydraulic actuator 115 via the actuator pump 125 in order to decrease the height of the mirrors 110. Integrating the actuator pump 125 into the heat exchanger 130 increases the cooling capacity due to the increased volume of fluid in the apparatus.

Figure 4A:
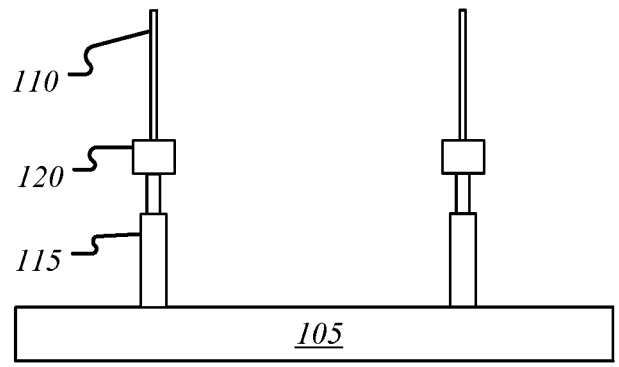
FIG. 4A is a side-view schematic of the photovoltaic system with the mirrors oriented to reduce a shadow on the photovoltaic cell according to one or more aspects of the disclosed subject matter.

During the course of the day, the sun moves from sunrise along the horizon to a peak and back down to the horizon at sunset. Sunlight includes two main components which can be termed the direct beam, which carries a majority of the solar energy, and the diffuse sunlight, carrying the remainder. Energy contributed by the direct beam sunlight drops off with the cosine of the angle between the incoming light and the plane of the PV cell 105. If the PV cell 105 is oriented on a surface, for example a roof, wherein the plane of the PV cell 105 is parallel or nearly parallel with the ground, the PV cell 105 will not receive as much direct beam sunlight during sunrise and sunset as compared to when the sun is disposed overhead at its peak position. As illustrated in FIG. 2A, according to one or more aspects of the disclosed subject matter, the sun tracking device can be configured to determine the position of the sun and instruct the DC motor 120 to rotate the mirrors 110 in order to reflect the direct beam sunlight onto the PV cell 105. For example, the mirrors 110 can be rotated such that sunlight is reflected onto the PV cell 105 wherein the reflected rays are perpendicular to the top surface of the PV cell 105. During the sun's movement from horizon to peak, a shadow behind the mirrors 110 can form and lead to a net decrease in the energy production of the PV cell 105 as compared to if the mirrors 110 were to reflect sunlight onto the PV cell 105. FIG. 4A illustrates an example orientation to reduce the shadow of the mirrors 110 according to one or more aspects of the disclosed subject matter. At a predetermined sun position, the mirrors 110 can rotate to an orientation wherein the shadow from the thickness of the mirrors 110 is reduced to a minimum, for example the mirrors 110 can rotate such that the plane of the mirrors 110 is parallel to the direction of the direct beam sunlight.

Figure 4B:
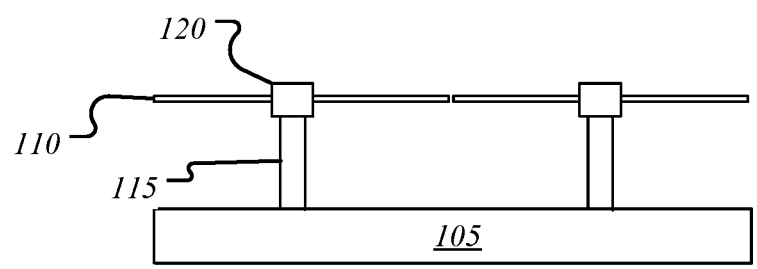
FIG. 4B is a side-view schematic of the photovoltaic system with the mirrors oriented to protect the surface of the photovoltaic cell according to one or more aspects of the disclosed subject matter.

As illustrated in FIG. 4B according to one or more aspects of the disclosed subject matter, upon sunset or determination by the PV cell 105 that the weather is not optimal for energy generation, for example if energy generation does not exceed a predetermined threshold, the mirrors 110 can be rotated to a parallel orientation relative to the top surface of the PV cell and laid flat to protect the surface from debris, such as water, sand, ice, and other foreign materials. The mirrors 110 can be disposed above the top surface and moved closer to the top surface until the mirrors 110 are in contact with the PV cell 110 top surface.

Figure 4C:
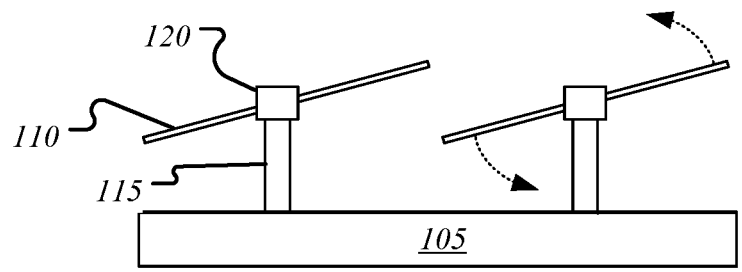
FIG. 4C is a side-view schematic of the photovoltaic system with the mirrors rotating to clean the surface of the photovoltaic cell according to one or more aspects of the disclosed subject matter.

The PV cell 105 can also be configured to detect the presence of accumulated debris, such as water, sand, ice, and other foreign materials, on the PV cell 105 surface. For example, the PV cell 105 can determine its energy generation based on the amount of received sunlight, for example via one or more sensors, and a predetermined threshold of decreased energy generation can trigger a cleaning procedure. FIG. 4C illustrates an example orientation for the cleaning procedure according to one or more aspects of the disclosed subject matter. The cleaning procedure can include repositioning the mirrors 110 to a predetermined distance away from the top surface of the PV cell 105 and rotating the mirrors 110 at high speed, for example 100 RPM or 5,000 RPM, in order to generate turbulent air flow. The resulting turbulent air can clear the PV cell 105 surface of debris, such as water, sand, ice, and other foreign materials, and recover operational efficiency. Thus, an optimal design of the mirrors 110 can be determined wherein structural integrity of the mirrors 110 is maintained for cleaning events where the mirrors 110 experience elevated forces that could lead to deformation, for example centripetal force, while being as thin as possible to reduce the shadow resulting from the thickness of the mirrors 110.

Figure 4D:
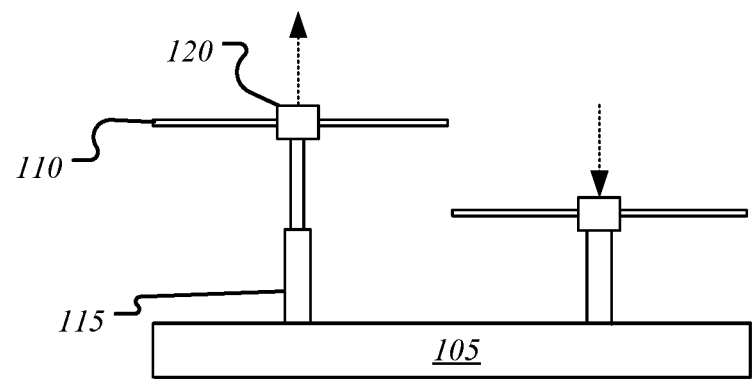
FIG. 4D is a side-view schematic of the photovoltaic system with the mirrors moving upwards and downwards to clean the surface of the photovoltaic cell according to one or more aspects of the disclosed subject matter.

FIG. 4D illustrates another example orientation for the cleaning procedure according to one or more aspects of the disclosed subject matter. In an alternative embodiment, the mirrors 110 can clean the surface of the PV cell 105 via alternating movements away from and towards the surface of the PV cell 105. The plane of the mirrors 110 can be rotated to a nearly parallel orientation relative to the plane of the PV cell 105 and the hydraulic actuator 115 can be configured to increase or decrease the distance of the mirrors 110 from the top surface of the PV cell 105. For example, the PV cell 105 can be oriented nearly parallel to the ground and the mirrors 110 can start at a height just barely above the surface of the debris, such as 10 cm above the surface, and the hydraulic actuator 115 can increase the height of the mirrors 110. After reaching a predetermined height, the hydraulic actuator 115 can decrease the height of the mirrors 110. The motion of the height increase and decrease can induce a pressure difference between the two sides of the mirrors 110 such that turbulent air flow is created. This turbulent air flow can cause the debris deposited on the surface of the PV cell 105 to move and fall off. The cycle of increasing and decreasing the height can be repeated until a predetermined operational efficiency has been recovered.

An advantage of the PV system 110 is that the mirrors 110 can be rotated to track the sun as compared to rotating the entire PV cell 105. Rotating the entire PV cell 105 results in higher energy consumption due to the heavier payload as compared to the lightweight mirrors 110. Additionally, the mirrors 110 can be configured to clean the PV cell 105 before, during, or after operation such that maximum efficiency in energy generation is maintained. The mirrors can also lay flat to protect the PV cell 105 during times of inclement weather, such as rain or sandstorms.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A hydraulically actuated solar energy tracking and harvesting system, comprising:
   a photovoltaic cell including:
      a sun tracker including circuitry configured to determine an angle and an intensity of incident sunlight and the position of the sun relative to the solar energy generating apparatus and adjust a rotation angle of a first mirror and a second mirror to reflect the incident sunlight onto a top surface of the photovoltaic cell configured to generate electrical energy from the incident sunlight, wherein the first mirror and the second mirror and the top surface of the photovoltaic cell are rectangular and a long axis of each of the first and second mirrors are parallel to a long axis of the photovoltaic cell; and
      a bottom surface configured to thermally dispel heat;
   wherein each of the first and second mirrors includes a reflective surface disposed proximal to the top surface of the photovoltaic cell;
   a plurality of hydraulic actuators each having a first end and a second end, wherein the first end is attached to the photovoltaic cell and the second end is attached to at least one of the first and second mirrors, wherein the first mirror is attached to two actuators disposed along a long axis of the first mirror and the second mirror is attached to two actuators disposed along a long axis of the second mirror;
   at least one hydraulic actuator pump connected to the plurality of hydraulic actuators and configured to extend or retract the plurality of hydraulic actuators and adjust the distance of each of the first and second mirrors from the top surface of the photovoltaic cell, wherein the hydraulic actuator pump is further connected to the heat exchanger and is configured to inject or withdraw a hydraulic fluid, wherein the hydraulic fluid is passed through the plurality of hydraulic actuators, a heat exchanger, and a radiator, which draws heat from the photovoltaic cell;
   wherein the heat exchanger is filled with the hydraulic fluid and disposed adjacent to and thermally coupled to the bottom surface of the photovoltaic cell;
   wherein the radiator is connected to the heat exchanger and is configured to cool the hydraulic fluid via thermal exchange with an external medium; and
   a fluid pump connected to the heat exchanger and configured to circulate the hydraulic fluid through the heat exchanger, and
   a motor attached to the second end of the plurality of hydraulic actuators, wherein the at least one of the first and second mirrors is secured to the motor and the motor is configured to rotate the at least one mirror.

2. The system of claim 1, wherein
   the photovoltaic cell is configured to detect the presence of foreign matter on the top surface of the photovoltaic cell and initiate a cleaning procedure;
   the cleaning procedure includes rotating the first and second mirrors to generate turbulent air flow and clean the surface of the photovoltaic cell.

3. The system of claim 1, wherein
   at least one of the first and second mirrors includes two side mirrors having;
   a reflective surface; and
   the side mirrors being adjustable from a first position behind the reflective surface of the at least one of the first and second mirrors to a second position adjacent to an edge of the at least one of the first and second mirrors.

* * * * *